Sept. 23, 1958      K. I. HARVEY      2,852,840
METHOD OF MAKING METAL REINFORCED PLASTIC BODIES
Filed April 22, 1953
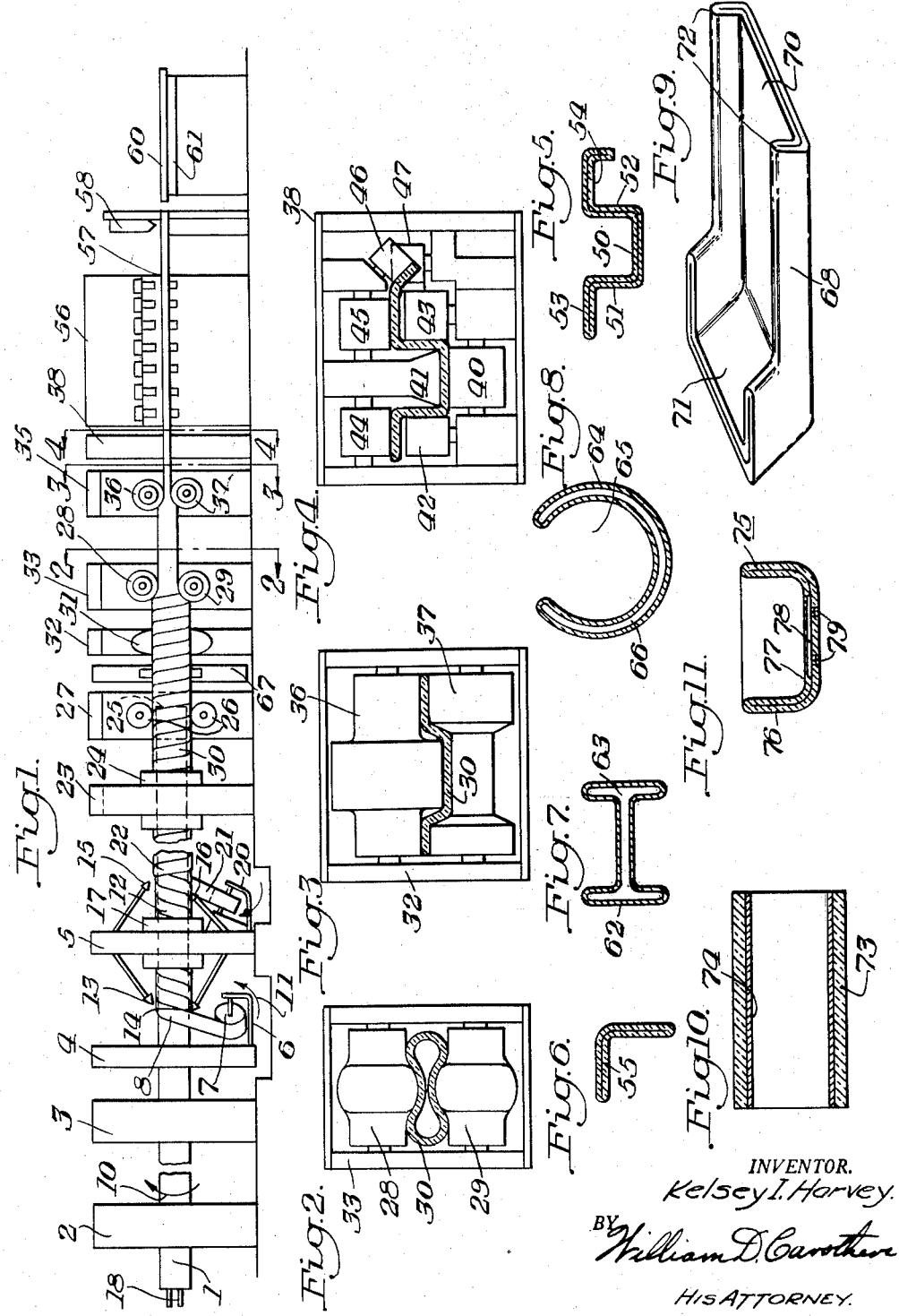
INVENTOR.
Kelsey I. Harvey.
BY William D. Carothers
HIS ATTORNEY.

United States Patent Office 2,852,840
Patented Sept. 23, 1958

2,852,840

METHOD OF MAKING METAL REINFORCED PLASTIC BODIES

Kelsey I. Harvey, Beaver, Pa.

Application April 22, 1953, Serial No. 350,296

2 Claims. (Cl. 29—472.9)

This invention relates generally to methods of making plastic shapes and more particularly to the method of making plastic shapes by first making a plastic tube and then squashing the tube into the desired shape before it becomes set.

This invention is carried out by first producing a tube of plastic material. It is preferable to employ thermo setting plastics that have the property of becoming tacky when heated to make the tube readily pliable while initiating polymerization of the plastic and when in this condition, passing the same through a forming throat which may be a polished die or a set of driven rolls disposed or arranged to press the tube into the desired shape. This shape may be a tube of round or rectangular cross-section, or the tube may be of circular cross-section and flattened into an angle, a channel, an H or I-beam, or any form desired. The tube is formed or produced on a hollow mandrel or core which may be collapsible or may form a part of the finished product. Again the formed tube may be continuously slid off the end of the mandrel and is preferably immediately processed and passed through the forming throat which enables the shape to be made before the plastic is too far on the road to polymerization. However, the tube may be severed in lengths. If a thermoplastic cementitious liquid is employed, it may be heated to make it pliable so that it can be readily reshaped by passing it through the forming throat or throats depending upon the number needed to produce the shape desired and for the purpose of setting the plastic by working.

The forming throat may be employed to conduct heat to the plastic to augment polymerization or to function in heating the plastic to lubricate the throat in case it is a polished die or to aid in drawing the tube through the throat when it is a set of heated rollers disposed to press the tube into shape.

Liners may be continuously placed on the core to continue with and become a laminated part of the reshaped form. These liners may be light and flexible, such as tubular goods formed from a sheeting of cellulose acetate or it may be a fabric of paper, wire mesh, fiber glass or a metal or other suitable material. After reshaping, a tubular member remains as the liner and becomes the inside or integral part of the tube. If the liner is a stainless steel tube, the reshaping throat would be a pressing process resulting in a coated tube. Such a tube could be used in installations preventing electrolytic action on the outside of the pipe.

As the different shapes are continuously formed definite lengths may be sawed from the polymerized end for stock.

The shapes formed by collapsing the tube amount to double wall thickness of the tube with the inner surfaces of the tube becoming integral with each other.

A mandrel may be used in the shaping throat against which the walls are pressure worked and left hollow. Such structures are frequently stronger than those where the tube walls are pressed into integral form.

The use of any of these reenforcing materials may be within the walls of the tube or covering the tube. They may be applied by helically wrapping the tube during the process of forming the same or they may be laid longitudinally of the tube and formed as an exterior surface or embedded therein or a combination thereof. This material if in fabric form, whether metal, cloth or glass, may be passed through a bath of the plastic forming the tube or the plastic may be sprayed or poured thereon while the tube is being formed.

Other objects and advantages appear hereinafter in the following description and claims.

The accompanying drawing illustrates the process comprising this invention diagrammatically wherein:

Fig. 1 is a diagrammatic illustration of the steps required for forming plastic shapes.

Fig. 2 is a sectional view taken on the line 2—2 of Fig. 1.

Fig. 3 is a sectional view taken on the line 3—3 of Fig. 1.

Fig. 4 is a sectional view taken on the line 4—4 of Fig. 1.

Fig. 5 is a sectional view of the structure being formed in Figs. 1 to 4 inclusive.

Fig. 6 is a cross sectional view of the angle member formed by the process illustrated in Fig. 1.

Fig. 7 is a cross sectional view of an open H-beam formed by the process as illustrated in Fig. 1.

Fig. 8 is a cross sectional view of an open crescent formed by the processes illustrated in Fig. 1.

Fig. 9 is a perspective view of a trough as formed by pressing a tubular blank.

Fig. 10 is a cross sectional view of a tube formed on a liner.

Fig. 11 is a cross sectional view of a pressed bowl having an insert.

Referring to Fig. 1, a plastic tube is formed on the core or the mandrel 1 which is rotatably supported by the standards 2 and 3. Each of the standards 2 and 3 is provided with rotary gripping jaws for the purpose of gripping and rotating the core 1. The purpose of having the spaced standards 2 and 3 is to permit the gripping mechanism of the standard 2 to be open to slide a core tube over the mandrel 1 while driving the same with the grip mechanism of standard 3. After the core has passed the standard 2, its gripping device then becomes effective and the gripping device of the standard 3 is open to permit the core member to be slid into the wrapping machine which is indicated by the stands 4 and 5. Any number of wrapping standards may be employed, however, only the two are shown.

The wrapping standard 4 is provided with one or more arms 6 which are rotated about the face of the standard 4 and around the mandrel 1 for carrying material to be fed or wrapped on the mandrel as indicated by the coil or spool 7 of the arm, which is in the form of a tape as indicated at 8 that is wrapped around the mandrel 1.

The mandrel 1 may be rotating as indicated by the arrow at 10 whereas the arm 6 is revolvable on the face of the stand in the direction indicated by the arrow 11 which, it will be noted, is in the same direction as that of the rotation of the mandrel 1 and in some instances, it is preferable to have the mandrel rotate in a different direction and at a different relative rate than the rate of applying the tape 8 to the tube being formed on the mandrel for the purpose of maintaining a slipping frictional mechanism by the tape 8 that forms the lowermost layer of the tube being formed.

The tape 8 may be of any suitable material. If it is desired to have a liner of material such as glass or cellophane in the tubes, the first layer is of thick material and the spool 7 may be constructed of such material. If, on the other hand, the original materials on the core are to be made of a fiber glass or a plastic saturated cloth, then a suitable spool of such material is placed at 7.

As the material is wound, it produces a helical covering such as indicated at 12, and this material may be pre-saturated with a resinous plastic or it may receive the plastic through the spray nozzles 13, 14, 15 and 16. These spray nozzles will spray the resinous plastic on and over the tape as it is being rolled on the mandrel 1. The center of the standard 5 is provided with a heater mechanism 17 which heats the wrapped mandrel. The mandrel itself may be provided with an internal heater, the energy supply for which comes out at the end and may be energized with a suitable source of energy from the source as indicated at 18.

The standard 5 is likewise provided with one or more arms 20 which are revolvably mounted on the face of the standard 5 and carry the spool 21. This arm may revolve in the opposite direction to that of the arm 6, and the tape 22 passing from the spool 21 is thus wrapped in the opposite direction of the mandrel 1. The nozzles 15 and 16 are likewise employed to supply a resinous plastic material on the tape as it is wound to form the second layer on the mandrel. There is a break indicated in the mandrel and the tube for the purpose of receiving and applying one or more additional layers in forming the plastic tube from additional standards.

The standard 23 is provided with a heater mechanism 24 for the purpose of heating the formed tube before it passes off the end of the mandrel, which is indicated at 25. The plastic tube is supported by the rollers 26 supported by the standard 27. The rollers 26 grip the formed tube and aid in withdrawing the same from the end of the mandrel, and the mandrel end at 26 is slightly smaller than the bore of the tube to aid in the removal of the formed tube from the end of the mandrel. The formed tube which is now indicated at 30 then passes through a forming die 31 supported by the standard 32 which die may be properly heated and shaped to initially press the tube as a step in its fabrication.

The tube 30 then passes to the standard 33, which is provided with the form rollers that are indicated at 28 and 29 and are likewise illustrated in Fig. 2. These forming rollers squash the tube 30 giving the tube its first flattening shape. Standard 35 is provided with the rollers 36 and 37 which are illustrated in Fig. 3 and which further shape the tube by squashing and deforming the intermediate and side portions thereof. Upon passing to the next standard 38, the pre-shaped tube 30 is no longer a tube but becomes a form of definite cross section, and it is supported on the roller 40 and passes under the iron 41 which forms a trough in the shape with the aid of the roller 40. The sides of the channel are shaped by the rollers 42, 43, 44 and 45 pressing against irons above the rollers 42 and 43. The outer flange is turned downwardly by a series of rollers such as indicated at 46 and 47.

After passing through the standard 38, the shape of the tube is indicated at Fig. 5 wherein the trough 50 is formed with a sharp channel with sides indicated at 51 and 52, and the flange on the channel side 51 is straight as indicated at 53, whereas the other flange is formed in reverse channel section as indicated at 54.

Any number of forms or shapes may be constructed from a tube as illustrated in Fig. 6. Angle 55 has been made from a tube. It will be seen that the tube has been crushed and what was formerly the opening through the central portion of the tube is now tightly cemented integral to the flattened side from the angle 55. The reinforcing materials that make up the tube are thus completely integrated into a solid mass or unit forming a solid mass throughout. Such a form structure then passes throughout the polymerizing chamber 56 as illustrated in Fig. 1, which causes the plastic material to set and take a permanent form, and this form illustrated at 57 in Fig. 1 passes out of the chamber 56. This formed member passes under a shearing machine such as indicated at 58 for the purpose of cutting the product into the lengths as indicated at 60. These lengths are supported on the roller table 61 and are distributed to stock piles or continue on their process of fabrication with other members. When deposited on the rack 61, the form shapes should be sufficiently set so that they will not become reshaped or tacky causing them to stick together or otherwise prevent them from being properly handled.

Frequently, it is undesirable to completely flatten the shape as it is preferable to increase the structural strength by spacing the double walled member. Such a structure is illustrated in Fig. 7 at 62 in the form of an H-beam. This structure has improved mechanical features for the reason that the center is open. If it is employed as a chute or trough, the material carried thereby can be heated by circulating steam or other media throughout the open passage through the support.

A similar use may be employed by a crescent shape, as illustrated at 64 in Fig. 8, wherein the interior is open as indicated at 65, and the walls are separated by a central space as indicated at 66.

Rather than reforming the tube as it is being withdrawn from the mandrel, a shear, such as indicated at 67, intermediate the standards 27 and 32, may be employed to cut lengths of pipe which are afterwards placed on a die and compressed to form shapes such as illustrated by the trough 68 in Fig. 9. Here the trough is shown as an integral member having a delivery end such as indicated at 70 and a higher charging end 71 with the sides 72 forming a U-shaped trough section. This form has also been pressed to produce this integral plastic body. Such a trough of this character may be employed on vibratory feeders.

In the structure as illustrated in Fig. 10, the plastic tube 73 has been formed on an inner tube such as the thin stainless steel tube 74. The stainless steel tube 74 is fed over the left end of the mandrel 1 and fed through the winding machine so as to apply the outer plastic tube thereon. After this tube has been thoroughly treated, the plastic material forms an integral outer coating upon the tube 74.

In the structure as shown in Fig. 11, we have a bowl 75 illustrated in cross section, having an annular wall 76 with an integral bottom 77, and has placed therein a plate member 78 prior to the pressing of the bowl. Such a bowl can be constructed from a tube into which is inserted the plate 78. The tube is then shaped in a die thereby fixing the insert 78 in the bottom thereof. Treaded openings 79 may be provided for mounting the bowl on a suitable base.

Other similar and kindred forms may be shaped in processing the plastic. However, the use of the tube, as the initial form, is subsequently reshaped to provide a plastic structure rather than employing a mere sheet for such purposes. The tube provides for reinforcing in opposite directions in the flattened and formed tube.

I claim:

1. The method of producing a structural member which comprises the steps of wrapping a tape carrying an unpolymerized resinous plastic over a metal core to produce a tubular body, heating the wrapping to initiate polymerization of the resinous plastic, simultaneously applying heat and pressure peripherally of the tubular body to form a tube, shaping the formed tube by rolling and squashing the tube and the metal core to form a solid integrated mass, reshaping the integrated mass to the cross section of the structural member with the plastic covering the metal core, heating the formed cross section of the structural member to completely polymerize the resinous plastic and provide a tightly cemented integral solid structure with the covered metal core, and cutting the same in lengths.

2. The method of producing a structural member which comprises the steps of wrapping a tape carrying an unpolymerized resinous plastic over an open mesh metal core to produce a tubular body, heating the wrapping to initiate polymerization of the resinous plastic, simultaneously applying heat and pressure peripherally of the tubular body to form a tube, shaping the formed tube by rolling and squashing the tube and the open mesh metal core to form a solid integrated mass with the resinous plastic joined through the open mesh core, reshaping the integrated mass to the cross section of the structural member with the plastic covering the open mesh metal core, heating the formed cross section of the structural member to completely polymerize the resinous plastic and provide a tightly cemented integral solid structure through and around the open mesh metal core, and cutting the same in lengths.

References Cited in the file of this patent

UNITED STATES PATENTS

| | | |
|---|---|---|
| 1,608,714 | Baker et al. | Nov. 30, 1926 |
| 1,818,227 | Livensparger | Aug. 11, 1931 |
| 1,944,970 | Dieffenbach | Jan. 30, 1934 |
| 1,985,997 | Keeran | Jan. 1, 1935 |
| 2,034,731 | Saalbach | Mar. 24, 1936 |
| 2,383,520 | Slaughter | Aug. 28, 1945 |
| 2,445,290 | Gonda | July 13, 1948 |
| 2,502,638 | Becht | Apr. 4, 1950 |
| 2,509,715 | Allen et al. | May 30, 1950 |
| 2,526,945 | Gray | Oct. 24, 1950 |
| 2,544,044 | Reber et al. | Mar. 6, 1951 |
| 2,572,924 | Gonda | Oct. 30, 1951 |
| 2,593,714 | Robinson | Apr. 22, 1952 |
| 2,609,320 | Modigliani | Sept. 2, 1952 |
| 2,661,499 | James et al. | Dec. 8, 1953 |
| 2,682,292 | Nagin | June 29, 1954 |